United States Patent [19]

Rudin

[11] 4,054,352

[45] Oct. 18, 1977

[54] ELECTRICAL POWER TAKE-OFF UNIT FOR CIGARETTE LIGHTER SOCKET OF VEHICLE

[76] Inventor: Marvin B. Rudin, 555 Middlefield Road, Mountain View, Calif. 94040

[21] Appl. No.: 764,935

[22] Filed: Feb. 2, 1977

Related U.S. Application Data

[63] Continuation of Ser. No. 607,736, Aug. 25, 1975, abandoned, which is a continuation-in-part of Ser. No. 581,313, May 27, 1975, abandoned, which is a continuation of Ser. No. 450,943, March 14, 1974, abandoned.

[51] Int. Cl.² .......................................... H01R 33/00
[52] U.S. Cl. ............................ 339/154 A; 219/270; 339/10; 339/91 R
[58] Field of Search ............... 339/91 R, 10, 150, 151, 339/154–158; 219/260–262, 265–267, 269, 270; 240/2 CL, 8.18

[56] References Cited

U.S. PATENT DOCUMENTS

| | | | |
|---|---|---|---|
| 1,728,049 | 9/1929 | Franklin | 240/8.18 |
| 2,572,475 | 10/1951 | Hanson | 219/262 |
| 2,812,423 | 11/1957 | Penna | 240/8.18 |
| 2,938,110 | 5/1960 | Busch | 240/8.18 |
| 3,137,448 | 6/1964 | Holzhause | 339/154 |
| 3,405,383 | 10/1968 | Jarboe | 339/158 |
| 3,526,751 | 10/1970 | Climent | 219/267 |

*Primary Examiner*—Roy Lake
*Assistant Examiner*—Mark S. Bicks
*Attorney, Agent, or Firm*—Townsend and Townsend

[57] ABSTRACT

An electrical power take-off unit which includes an adaptor for insertion into the cigarette lighter socket of a vehicle wherein the adaptor has means for tapping off electrical power from the electrical terminals in the socket so as to be able to supply electrical power to accessories, such as calculators, clocks, computers and the like, carried in the vehicle. The adaptor may be provided with a socket itself for receiving the cigarette lighter. Means can also be provided on the adaptor to directly mount an accessory, such as a digital clock, thereon. The adaptor can also be used even when an accessory is mounted directly on the instrument panel of a vehicle. In such a case, electrical conductors extending from the adaptor to the accessory can be concealed in a decorous manner.

14 Claims, 4 Drawing Figures

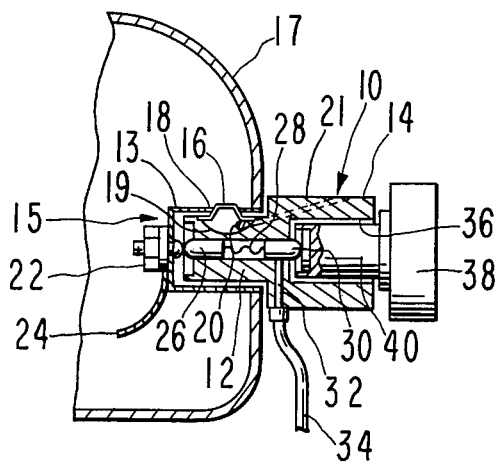
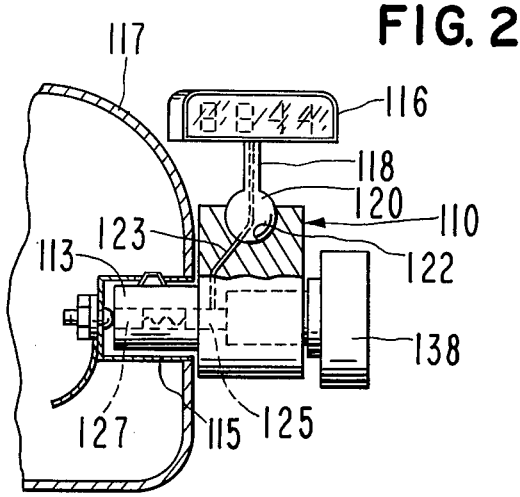
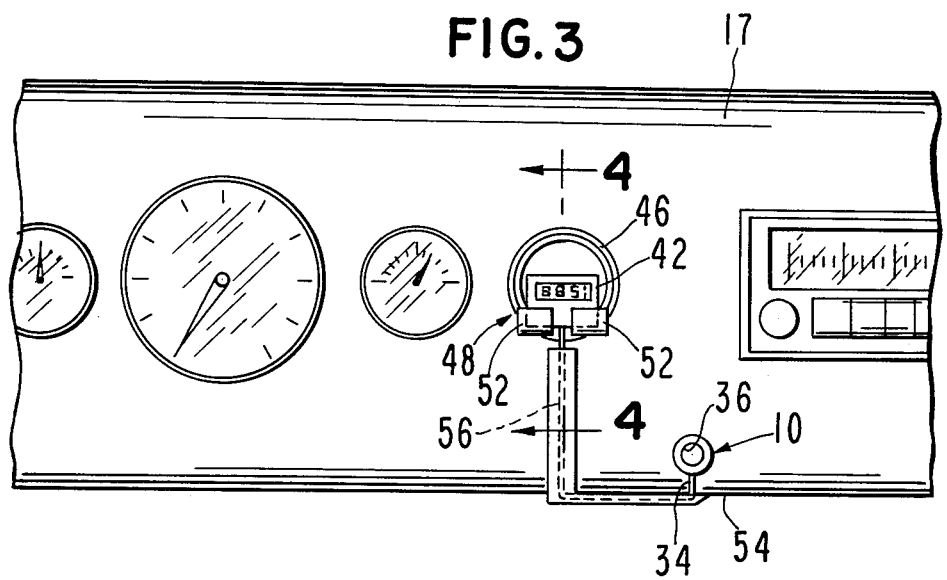
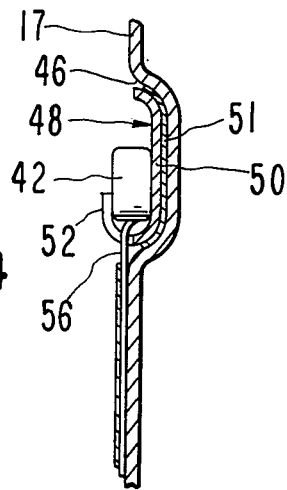

ELECTRICAL POWER TAKE-OFF UNIT FOR CIGARETTE LIGHTER SOCKET OF VEHICLE

This is a continuation of application Ser. No. 607,736, filed Aug. 25, 1975, now abandoned, which is a continuation-in-part of Ser. No. 581,313 filed May 27, 1975, now abandoned, which is a continuation of Ser. No. 450,943 filed Mar. 14, 1974, now abandoned.

This invention relates to improvements in the use of cigarette lighters in vehicles and, more particularly, to an improved adaptor for tapping off electrical power supplied to the socket of such a cigarette lighter.

BACKGROUND OF THE INVENTION

Most passenger vehicles and many other types of motor vehicles have a cigar or cigarette lighter unit installed on the instrument panel or dashboard as standard equipment. Such unit includes a fixedly mounted socket and a lighter member which is removably received in the socket. The size and shape of the socket and lighter member are standarized in vehicles manufactured in the United States.

Tyically, such a lighter unit is not used as a means of supplying electrical power to electrical and electronic accessories on the instrument panel or at other locations in the vehicle itself. This is probably due to the fact that such use prevents ready access to the lighter function in that it would prevent use of the lighter member. Also, the socket of the lighter unit is not used as means for mounting accessory devices or equipment. This latter drawback is probably due to the fact that the size of the accessories which might be mounted prohibits such use. Also, such mounting would prevent the use of the lighter function. Furthermore, accessories, such as lamps or the like, which do use the lighter socket for electrical power do not require continuous power to be effective as do electronic devices having memories, such as calculators, clocks, computers and the like.

Thus, in view of the foregoing, there is a need for a convenient source of electrical power for electronic and electrical accessories in a vehicle, which accessories augment the factory-supplied information and comfort devices on the instrument panel and in the general area of the driver of the vehicle. By a convenient source is meant such a source which requires no special skills or significant effort to use or install in place. To provide such a convenient source of electric power for memory-based devices, such as clocks, calculators, computers and the like, the following criteria should be satisfied to provide acceptance by a wide audience of vehicle drivers:

1. There must be a suitable mounting place for the accessory, one which does not detract from the decor of the instrument panel or the interior of the vehicle and one which does not block the view of other accessories near the driver;

2. The cigarette lighter capability must be retained if possible although the fact that more and more people are non-smokers or are becoming so permits the elimination of the lighter capability in certain cases;

3. The power source must be readily installable in a cigarette lighter socket by persons without special skills or who are not mechanically inclined;

4. The power source should be secured against theft even if it requires extra cost.

SUMMARY OF THE INVENTION

The present invention provides an improved structure for satisfying all of the aforesaid criteria. To this end, the invention provides an extender or adaptor for insertion into the socket of a conventional cigarette lighter unit of a vehicle and the adaptor has means for tapping off and supplying electrical power on a continuous basis for use by accessories, such as calculators, clocks, computers and the like, all of which are memory-based and generally require electrical power continuously. The adaptor is preferably provided with means for locking the same into the socket to prevent theft and unauthorized removal therefrom. The adaptor may be provided with a socket itself for receiving the conventional cigarette lighter member, whereby the ligher capability of the cigarette lighter unit can be retained. This latter feature is optional as desired if, for instance, the vehicle driver is a non-smoker or does not wish to encourage his passengers to smoke while in the vehicle.

In one embodiment, the adaptor has an electrical power tap-off provided for supplying electrical power to an accessory remotely from the adaptor itself. To this end, the accessory can be mounted on the instrument panel in a suitable location, such as an accessory cut-out initially provided in the instrument panel. A decorous covering can be provided between the adaptor and the accessory to mask the electrical leads therebetween.

In another embodiment, the adaptor is provided with means for mounting an accessory directly to the adaptor itself. Such mounting means can include a rigid or pivotally mounted arm, a gooseneck extension, or other such connecting means. The mounting can be such that the accessory is directly viewable by the vehicle driver or occupant without interfering with the view of other accessories on the instrument panel.

The primary object of this invention is to provide an improved electrical power source for the interior of a vehicle having a conventional cigarette lighter unit wherein the source comprises an adaptor insertable into the socket of the lighter unit with the adaptor having means for tapping off electrical power therefrom so that one or more electrical or electronic accessory can be mounted either on the instrument panel of the vehicle or directly on the adaptor itself and the accessories can be continuously supplied with electrical power to thereby permit the vehicle driver to utilize calculators, clocks, computers and the like while operating his vehicle.

Another object of this invention is to provide a power source as described wherein the adaptor can be provided with a socket for receiving the conventional cigarette lighter unit to allow the vehicle driver and passengers to have access to the lighter capability of the lighter unit notwithstanding the continuous presence of the adaptor which supplies continuous electrical power to one or more accessories requiring such continuous electrical power.

A further object of this invention is to provide a power source as set forth above wherein the adaptor is easily installed even by those with little or no mechanical skills yet the adaptor can be secured in place to prevent theft or unauthorized removal thereof from the lighter socket.

Still another object of this invention is to provide an improved electrical power source of the type described wherein the source includes an adaptor which does not detract from the decor of the instrument panel and can be used with accessories spaced a distance from the lighter socket in a manner to mask any electrical connections extending between the adaptor and the accessories.

Other objects of this invention will become apparent as the following specification progresses, reference being had to the accompanying drawing for an illustration of several embodiments of the invention.

In the drawing:

FIG. 1 is a vertical section through a portion of an instrument panel having a conventional cigarette lighter unit thereon, and illustrating the adaptor of this invention inserted into the socket of the lighter unit for providing a source of electrical power for accessories remote from the socket;

FIG. 2 is another embodiment of the adaptor wherein the adaptor has means for mounting an accessory, such as a digital clock, directly thereto;

FIG. 3 is a fragmentary, front elevational view of a vehicle instrument panel showing the way in which the adaptor of FIG. 1 is used to supply electrical power to an accessory, such as a clock remote from the lighter socket into which the adaptor is placed; and FIG. 4 is a cross-sectional view taken along line 4—4 of FIG. 3.

The first embodiment of the power source of the present invention is illustrated in FIG. 1 and includes an extender or adaptor 10 having a first cylindrical part 12 for insertion into the tubular, cylindrical socket 13 of a standard cigarette lighter unit 15 mounted at any suitable location in the instrument panel 17 of a vehicle. Adaptor 10 further includes a second cylindrical part 14 integral with part 12 but having a greater diameter than the latter. Parts 12 and 14 are of electrically insulating material. Part 12 has one or more spring-out retainers 16 which snap out and extend into corresponding slots 18 in socket 13 when part 12 is fully inserted into socket 13. When adaptor 10 is pulled outwardly of the socket, retainer 16 is cammed into a recess 19 formed in part 12, thereby permitting removal of adaptor 10 from the socket.

The retainers can be releasably locked or held in notches 18 by respective pins 20 which extend through corresponding holes or passages 21 in adaptor 10. Such a passage 21 is shown in dashed lines in FIG. 1. The hole extends longitudinally of the adaptor and is slanted to its central axis. Thus, the corresponding pin 20 can be put in or taken out from the side of part 14 near its outer end.

After one or more pins 20 are in place, adaptor 10 cannot be removed from the socket. This assures against theft and unauthorized removal of the adaptor. The pins are designed so that only a special tool can remove them to release adaptor 10 from socket 13.

Instead of using retainers 16, which project into slots 18 of socket 13, spring retainers (not shown) could be used which move into frictional engagement with the inner surface of socket 13. A tapered pin would be provided in each hole 21, which pin would be rotatable to cam the corresponding retainer into frictional engagement to the inner surface of the socket.

The socket has an electrical terminal 22 to which a lead 24 is connected, lead 24 being coupled to the battery of the vehicle. Terminal 22 is engageable by a metallic plug 26 carried by part 12 in a central passage 28 therethrough. A second plug 30 at the opposite end of the passage makes electrical contact with a conductor 32 which extends laterally of the passage and terminates at the outer periphery of part 14. A cable 34 makes electrical contact with lead 32 and extends away from adaptor 10. Cable 34 provides the power take-off means to an accessory (not shown in FIG. 1) spaced from the adaptor.

Cable 34, as shown in FIG. 1, is premanently attached to conductor 32. In the alternative, a socket electrically coupled to conductor 32 can be provided near the outer periphery of part 14 for receiving a terminal pin on one end of cable 34. Thus, the cable can be separated from adaptor 10. Moreover, more than one conductor 32 may be provided for supplying electrical power by way of respective cables 34 to several accessories spaced from adaptor 10. Also, there may be several different pin-receiving sockets coupled to respective leads 32 in lieu of permanently connecting cables 34 to respective conductors 32, the sockets being spaced about the periphery of part 14.

Part 14 may be provided, if desired, with an open-end, cylindrical recess 36 for receiving the conventional cigarette lighter member 38, the one ordinarily receivable in socket 13. If constructed in this manner, adaptor 10 can supply continuous electrical power to one or more accessories spaced from the adaptor yet the user of the adaptor still has the cigarette lighter capability afforded by the presence of lighter member 38. The lighter member has a cylindrical portion 40 insertable within recess 36, portion 40 having the usual frictional retaining means to releasably hold it in recess 36.

Adaptor 10 may be used with any one of a number of different accessories, such as calculators, clocks, computers and the like, which may or may not be memory-based and which may or may not require a continuous supply of electrical power. A typical application of adaptor 10 is shown in FIGS. 3 and 4 wherein a digital clock 42 is utilized at a location spaced from lighter socket 13 on the instrument panel 17 of a vehicle. Clock 42 is located at a cut-out 46 initially provided in the instrument panel when the latter is manufactured. A suitable holder 48 having a back 50 is secured by an adhesive 51 to the front surface of the cut-out as shown in FIG. 4. Holder 48 further includes a pair of spaced, front parts 52 (FIG. 3) disposed forwardly of and spaced from back 50. Clock 42 is placeable in holder 48 in the region between back 50 and front parts 52 as shown in FIG. 4. Cable 34 extends from adaptor 10, along the undersurface 54 of the instrument panel, then up the front face of the instrument panel to clock 42 as shown in FIGS. 3 and 4. To preserve the decor of the instrument panel, a low-cost plastic mount of a tape-like construction having a self-adhesive backing can be provided for this purpose. An adhesive plastic conduit 56 runs down the front of the instrument panel and is split to accept power cable 34. These low-cost plastic pieces can be produced and stocked for all popular car models, thereby permitting electronic accessories to be standardized for various vehicle configurations.

Another embodiment of the extender is shown in FIG. 2 and is denoted by the numeral 110. Adaptor 110 is substantially the same in construction as adaptor 10 except that adaptor 110 has an enlarged, outer part 114 to which an accessory 116 can be mounted directly. For purposes of illustration, accessory 116 comprises a digital clock mounted on the outer end of an arm 118 which is secured to part 114 in any suitable manner. Again, for purposes of illustration, arm 118 is integral with a ball 120 pivotally mounted in a spherical recess 122 in part 114 so as to provide a ball-joint connection between the arm and the part. In lieu of the presence of ball 120, arm 118 can be rigidly connected to part 114 or other variations can be provided, such as a gooseneck extension. This allows manipulation of the accessory to permit it to be oriented for optimum viewing as determined by the vehicle driver or an occupant of the vehicle. The electrical connections to the clock can be made by way of a first cable 123 extending through arm 118, ball 120 and part 114 to a first plug 125 electrically coupled to a second plug 127 in a central passage in the inner part 113 of adaptor 110, part 113 being insertable within a socket 115 which is substantially the same in all respects as socket 13 of FIG. 1.

Many vehicles will have insufficient room for the use of the ball-joint feature of adaptor 110 and some may not even be able to accommodate even the adaptor. In most cases, the electronic accessories will have a display and will require a line-of-sight position with respect to the vehicle driver. This is facilitated by the ball-joint connection. However, it may not be necessary for many vehicles since the lighter socket is usually designed to be in plain view and hence the simple direct plug-in accessory of FIG. 1 with the accessory mounted directly on part 114 can be used. Thus, as in the FIG. 2 embodiment, the accessory would be both powered and supported by the adaptor; again, the adaptor may or may not have the lighter capability inasmuch as lighter member 138 can be eliminated if desired. Adaptor 110 will be locked in place in the socket in any suitable manner, such as described above with respect to the embodiment of FIG. 1.

While the foregoing description has been made with respect to the mounting of the cigarette lighter unit on the instrument panel of a vehicle, it is to be understood that these lighter units can be mounted in a vehicle door or on an armrest in the vehicle. Also, locking means other than that described above can be used to releasably lock the adaptor in the lighter socket.

I claim:

1. An auxiliary power source for a vehicle of the type having a cigarette lighter unit provided with a socket for receiving a cigarette lighter member with the vehicle socket having at least one side slot, said source comprising: an adaptor having a first part for insertion into the vehicle socket and a second part integral with and adjacent to the first part and disposed exteriorly of the vehicle socket when the first part is disposed therewithin said first part having a side projection movable into and out of the side slot of the vehicle socket; and means carried by the adaptor for releasably holding the side projection and preventing movement of the side projection out of the side slot to thereby releasably lock the adaptor thereto, said second part having a socket of a size and depth for removably receiving a cigarette lighter member, said first part having first electrically conducting lead means for electrically interconnecting the vehicle socket and the socket of the second part when said first part is inserted into the vehicle socket, said adaptor having second electrically conducting lead means in said second part electrically coupled to and extending laterally from the first conducting lead means, there being a cable coupled to and extending outwardly of the second conducting lead means for attachment to an electrical accessory spaced from the vehicle socket when the first part is inserted therein to provide continuous electrical power to the accessory.

2. A power source as set forth in claim 1, wherein said side projection comprises a retainer biased outwardly of the first part, said holding means comprising a pin extending longitudinally of the adaptor.

3. A power source as set forth in claim 2, wherein said retainer has a cam surface engageable with said vehicle socket to facilitate the movement of the retainer out of the side slot of the vehicle socket when the adaptor is moved outwardly of the vehicle socket and when said pin is out of holding relationship to said retainer.

4. A power source as set forth in claim 2, wherein said first and second parts have a pin-receiving passage extending at an angle relative to the longitudinal axis of the adaptor, said pin being shiftably received within the passage.

5. A power source as set forth in claim 4, wherein the entrance end of the passage is at the side of the second part near its outer end.

6. A power source as set forth in claim 1, wherein is included a cigarette lighter member removably receivable in the socket of the second part.

7. For use with a vehicle having a cigarette lighter unit provided with a socket for receiving a cigarette lighter member with the vehicle socket having at least one side slot: an adaptor having a first part for removable insertion into the vehicle socket and a second part integral with and adjacent to the first part and disposed exteriorly of the vehicle socket when the first part is inserted therein, said first part having a side projection movable into and out of the side slot of the vehicle socket; means carried by the adaptor for releasably holding the side projection in the side slot of the vehicle socket to thereby releasably lock the adaptor thereto, said second part having a socket of a size and depth for removably receiving an electrical power transfer plug member; an electrical accessory; means on said second part for mounting the electrical accessory thereon; first lead means electrically interconnecting the vehicle socket and the socket of the second part when the first part is inserted into the vehicle socket, whereby electrical power can be supplied to an electrical power transfer plug member in the socket of the second part; and second lead means carried by the adaptor and said mounting means for electrically interconnecting the first lead means and the accessory when the first part is inserted into the vehicle socket.

8. The combination as set forth in claim 7, wherein said plug member comprises a cigarette lighter member.

9. The combination as set forth in claim 7, wherein said side projection comprises a retainer biased outwardly of the first part, said holding means comprising a pin extending longitudinally of the adaptor.

10. The combination as set forth in claim 9, wherein said retainer has a cam surface engageable with said vehicle socket to facilitate the movement of the retainer out of the side slot of the vehicle socket when the adaptor is moved outwardly of the vehicle socket and when said pin is out of holding relationship to said retainer.

11. The combination as set forth in claim 9, wherein said first and second parts have a pin-receiving passage extending at an angle relative to the longitudinal axis of the adaptor, said pin being shiftably received within the passage.

12. The combination as set forth in claim 11, wherein the entrance end of the passage is at the side of the second part near its outer end.

13. The invention as set forth in claim 7, wherein said accessory mounting means includes an arm, said second lead means extending along said arm.

14. The invention as set forth in claim 13, wherein said second lead means extends through said arm.

* * * * *